(12) United States Patent
Ou

(10) Patent No.: US 9,539,720 B2
(45) Date of Patent: Jan. 10, 2017

(54) TOOL HOLDER

(71) Applicant: Yu-Hua Ou, Taichung (TW)

(72) Inventor: Yu-Hua Ou, Taichung (TW)

(*) Notice: Subject to any disclaimer, the term of this patent is extended or adjusted under 35 U.S.C. 154(b) by 45 days.

(21) Appl. No.: 14/728,353

(22) Filed: Jun. 2, 2015

(65) Prior Publication Data

US 2016/0354921 A1 Dec. 8, 2016

(51) Int. Cl.
*B25H 3/00* (2006.01)
*F16M 11/20* (2006.01)
*F16M 11/38* (2006.01)
*B65D 25/28* (2006.01)
*B65D 25/22* (2006.01)

(52) U.S. Cl.
CPC ............ *B25H 3/003* (2013.01); *B65D 25/28* (2013.01); *F16M 11/2021* (2013.01); *F16M 11/38* (2013.01); *B65D 25/22* (2013.01); *B65D 25/2835* (2013.01); *B65D 2525/286* (2013.01)

(58) Field of Classification Search
CPC .......... B25H 3/002; B25H 3/00; B65D 25/28; B65D 25/2835; B65D 25/2838; B65D 25/2852; B65D 25/2841; B65D 25/2844; B65D 25/2855; B65D 25/2858; B65D 2525/286; B65D 2525/288; B65D 25/10; F16M 11/38; F16M 11/2014; F16M 11/2012; F16M 11/06; F16M 11/08; F16M 11/10; B25B 13/56

USPC ... 220/761, 762, 763; 206/372, 378; 16/334, 16/344
See application file for complete search history.

(56) References Cited

U.S. PATENT DOCUMENTS 6,131,740 A * 10/2000 Huang ................... B25H 3/003
206/372
2010/0090085 A1* 4/2010 Corrion ................ A47B 23/043
248/459

FOREIGN PATENT DOCUMENTS

TW M454911 6/2013

* cited by examiner

*Primary Examiner* — Anthony Stashick
*Assistant Examiner* — Mollie Impink
(74) *Attorney, Agent, or Firm* — Muncy, Geissler, Olds & Lowe, P.C.

(57) ABSTRACT

A tool holder is provided, including a main body, a back cover and a handle. The main body has two side faces opposite to each other. An end of the main body is a first end, and the second end of the main body is a second end. The first end is formed with a hanging portion. The back cover is pivoted to the second end, and the back cover is closable or expendable relative to the main body to make an inner surface thereof selectively cover or uncover one side face of the main body. The handle is disposed on the hanging portion, and one said side face of the main body is recessively formed with a receiving space. The handle is selectively expendable or closable to be arranged in the receiving space.

8 Claims, 9 Drawing Sheets

TOOL HOLDER

BACKGROUND OF THE INVENTION

Field of the Invention

The present invention relates to a tool holder.

Description of the Prior Art

A tool holder as disclosed in TWM454911 includes a main body and a connecting member. An upper end of the main body is further fixedly formed with a handle, and the connecting member is detachably disposed on the main body. The connecting member can fixedly arrange a plurality of tools between the main body and the connecting member.

The handle of the conventional tool holder stands straightly on the main body; therefore, when in actual practice, the handle occupies space.

The present invention has arisen to mitigate and/or obviate the afore-described disadvantages.

SUMMARY OF THE INVENTION

The major object of the present invention is to provide a tool holder which is convenient to be carried via a handle. The tool holder can be arranged in a receiving space of a main body to prevent the tool holder from occupying too much space when the tool holder is put away.

To achieve the above and other objects, a tool holder of the present invention is provided, including a main body, a back cover and a handle. The main body has two side faces opposite to each other. An end of the main body is a first end, and the other end of the main body is a second end. The first end is formed with a hanging portion. The back cover is pivoted to the second end, and the back cover is closable or expendable relative to the main body to make an inner surface thereof selectively cover or uncover one said side face of the main body. The handle is disposed on the hanging portion, and one said side face of the main body is recessively formed with a receiving space. The handle is selectively expendable or closable to be arranged in the receiving space.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
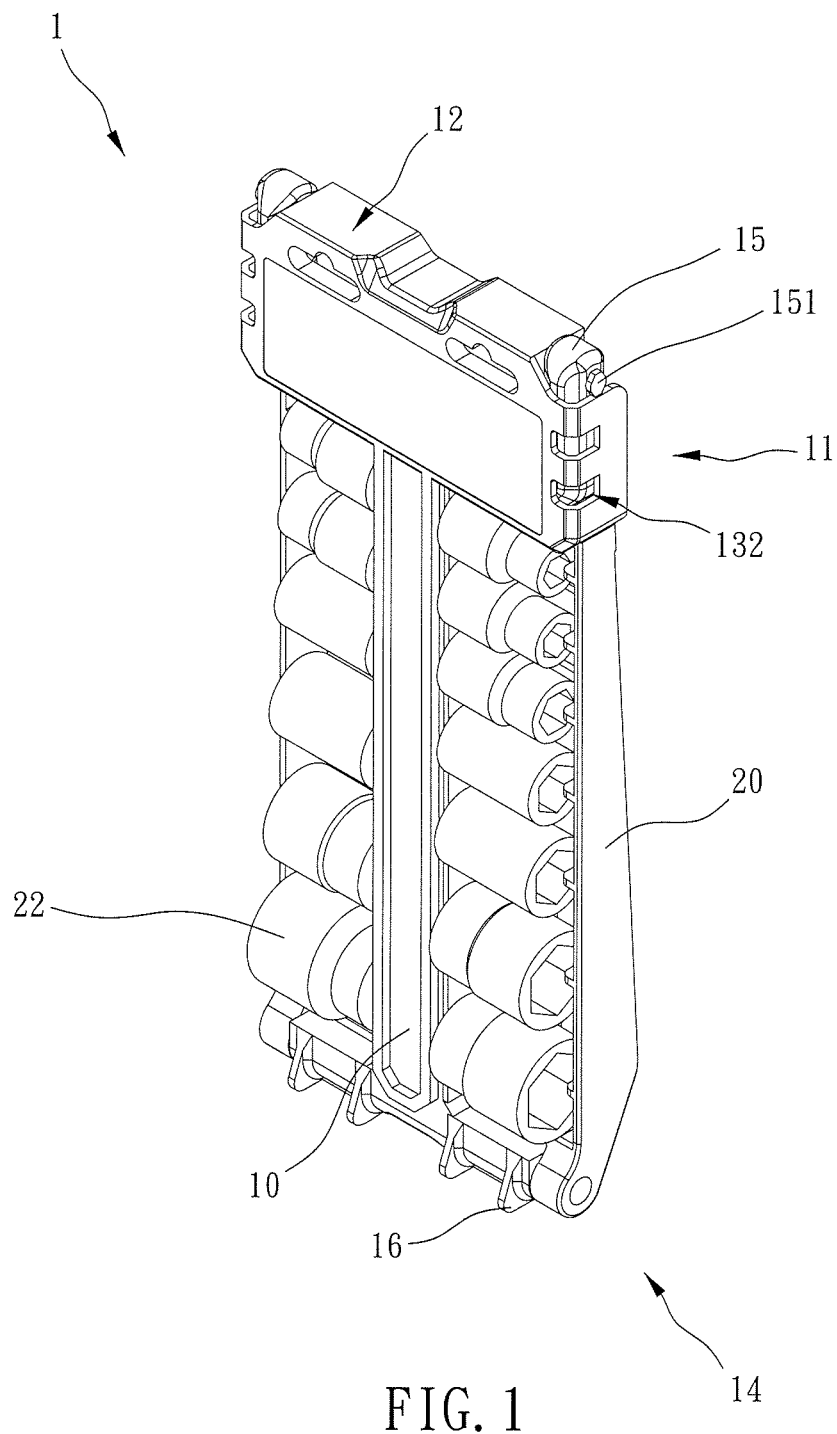
FIG. 1 is a perspective view of a preferred embodiment of the present invention.
Figure 2:
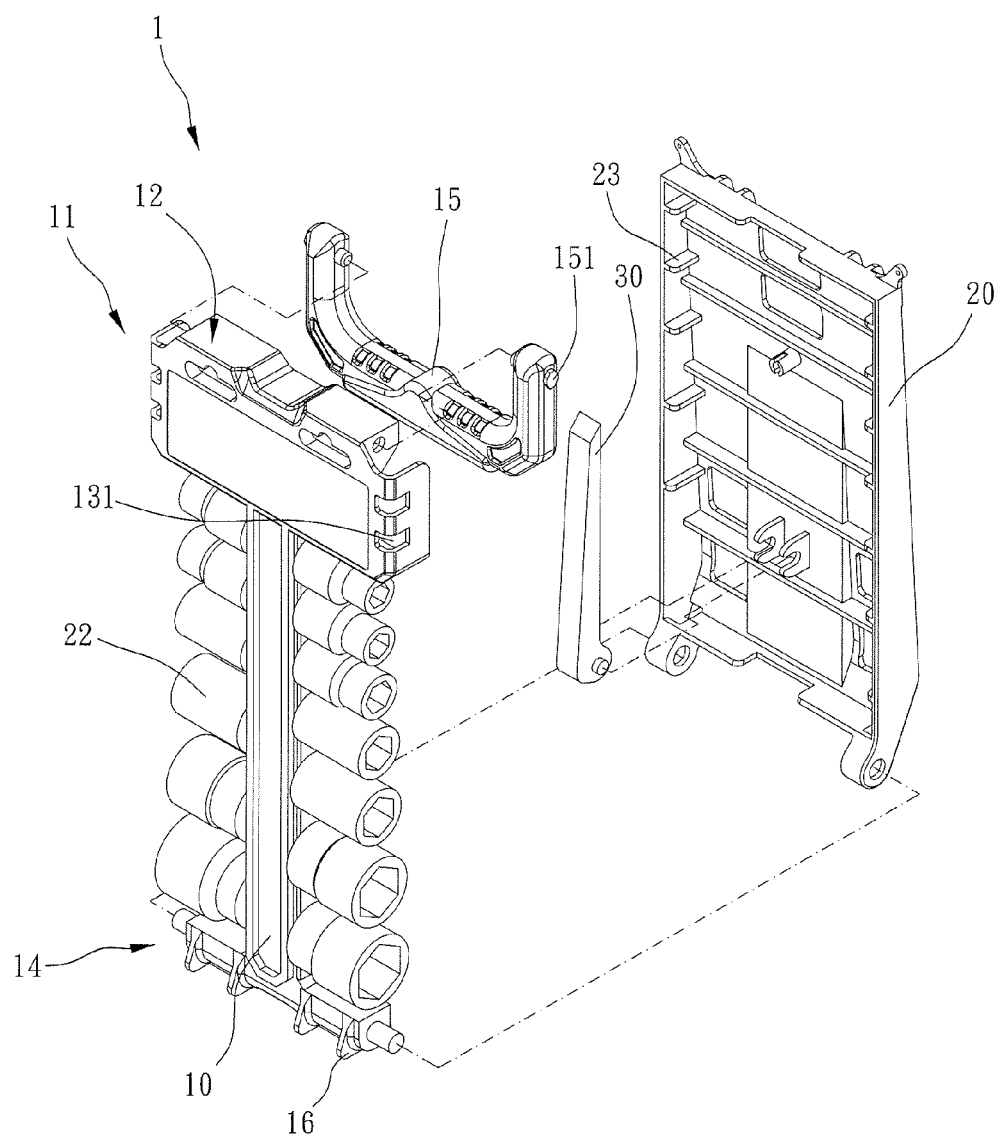
FIG. 2 is a breakdown view of the preferred embodiment of the present invention.
Figure 3:
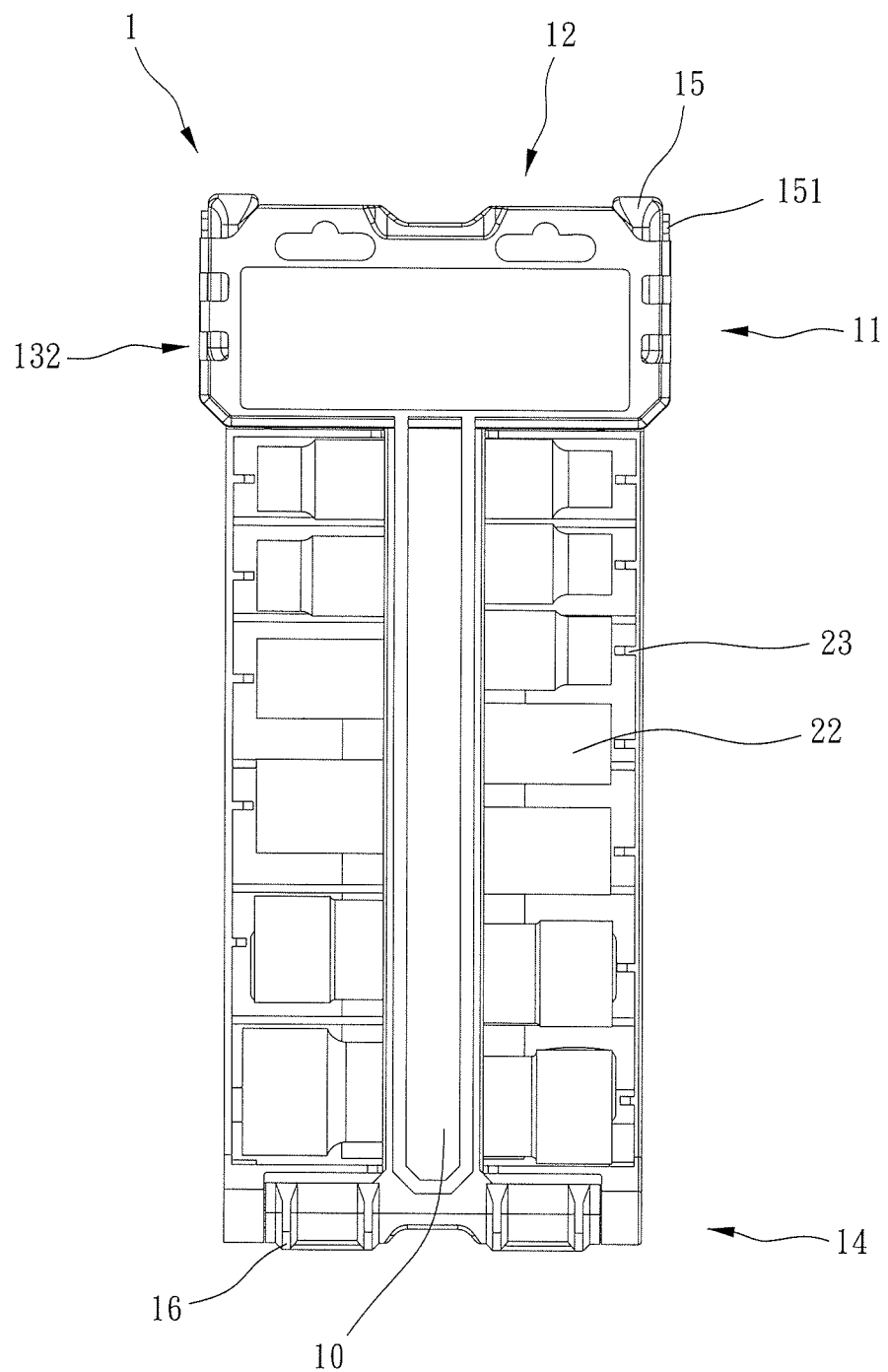
FIG. 3 is a frontal view of the preferred embodiment of the present invention.
Figure 4:
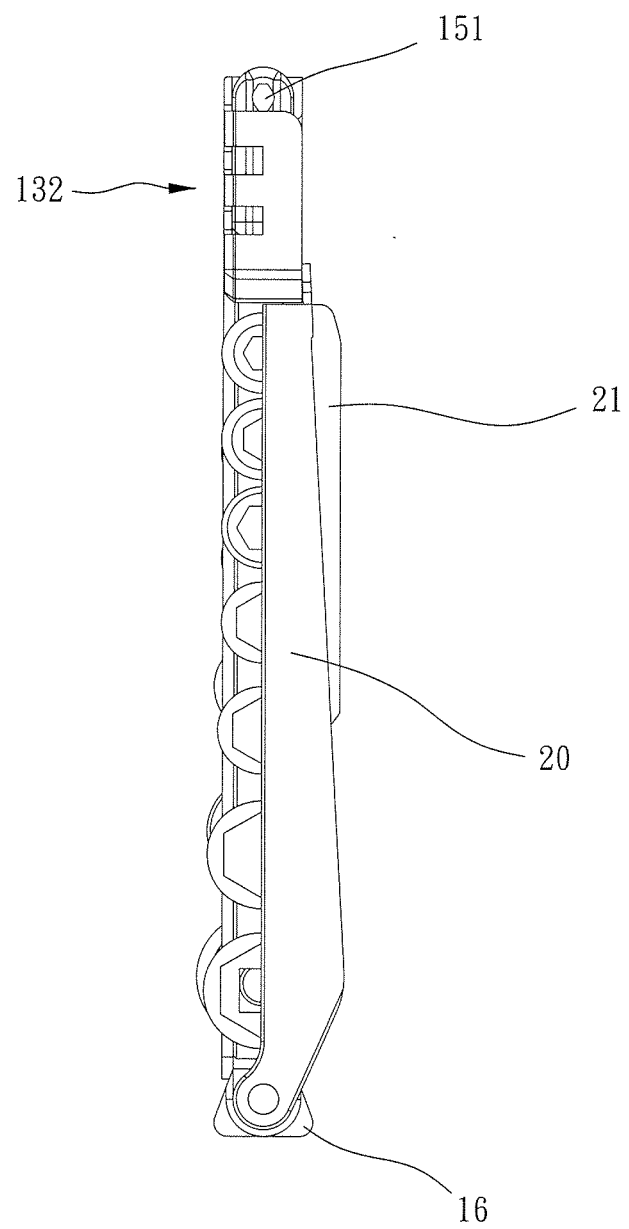
FIG. 4 is a right side view of the preferred embodiment of the present invention.

The present invention will be clearer from the following description when viewed together with the accompanying drawings, which show, for purpose of illustrations only, the preferred embodiment in accordance with the present invention.

Please refer to FIGS. 1 to 10 for a preferred embodiment of the present invention. A tool holder 1 includes a main body 10, a back cover 20 and a handle 15.

The main body 10 has two side faces opposite to each other. An end of the main body 10 is a first end 11, and the other end of the main body 10 is a second end 14. The first end 11 is formed with a hanging portion 12, and the hanging portion 12 may have, for example, a hanging hole, a hook portion or other hanging structures.

In this embodiment, the hanging portion 12 is further formed with a handle 15, and one said side face of the main body 10 is recessively formed with a receiving space 13. The handle 15 is selectively expendable or closable to be arranged in the receiving space 13. Thereby, the tool holder 1 is convenient to be carried, and when the handle 15 is out of use, the handle 15 can be closed and arranged in the receiving space 13 so as to save a space occupied by the tool holder 1. Specifically, the main body 10 is further formed with a plurality of protruding ribs 133 (the protruding rib 133 may also be an elongate protruding rib) which are protrusive into the receiving space 13. When the handle 15 is closed, the protruding ribs 133 may abut against the handle 15 to allow the handle 15 to be positioned in the receiving space 13. It is understandable that the other side face of the main body may be formed with a marking face opposite to the receiving space 13, and labels and pictures and texts may be further stuck or printed on the marking face so that a user can identify the tool holder 1 easily.

To identify a dimension (for example, imperial standard or metric standard) of a tool, the handle 15 may be in different colors or shapes according to different dimensions of tools, the main body 10 has a plurality of through holes 131 (a number of the through hole may be one, and at least part of the main body may be transparent) which are communicated with the receiving space 13, and the main body 10 is formed with, through the through holes 131, an identification portion 132 from which a part of the handle 15 is viewable; hence, the user can see a color or a shape of the handle 15 from the other side of the receiving space 13 and identify the dimension of the tool.

Figure 9:
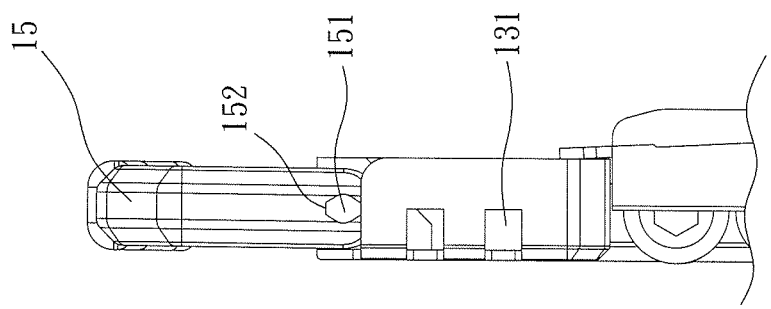
FIG. 9 is a partial enlarged view of the preferred embodiment of the present invention in use.
Figure 8:
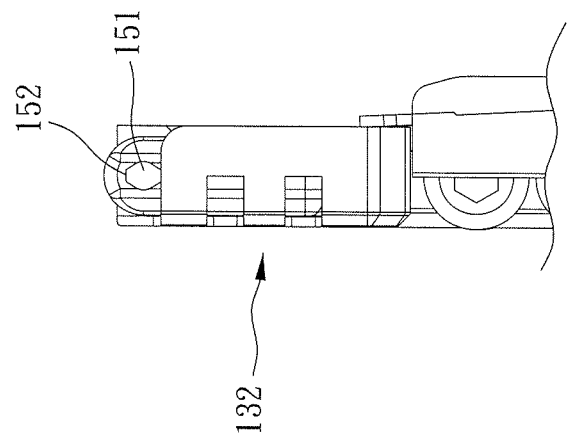
FIG. 8 is a partial enlarged view of the preferred embodiment of the present invention.
Figure 10:
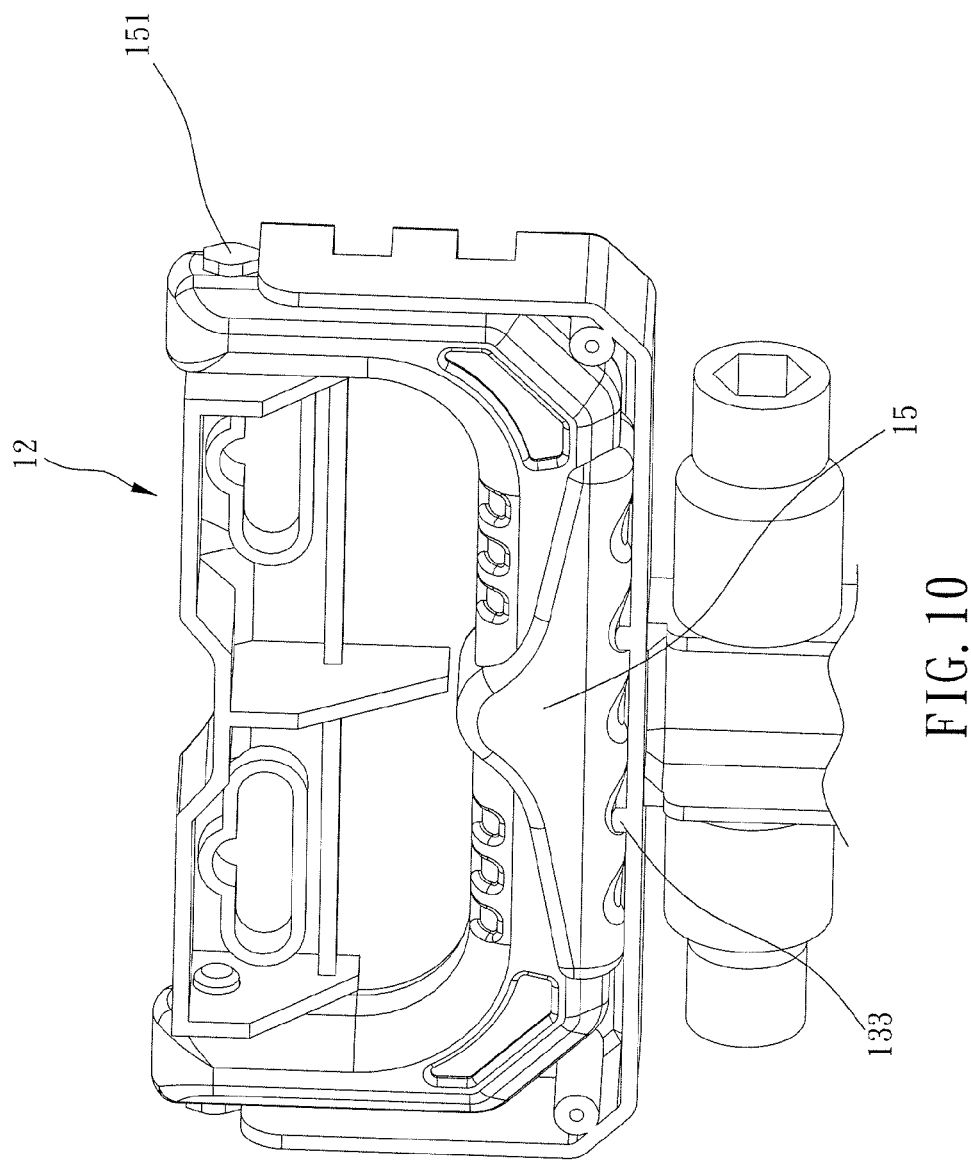
FIG. 10 is a partial enlarged view of the preferred embodiment of the present invention from another perspective.

In this embodiment, each of two sides of the handle 15 is formed with a protrusion 151 respectively (or on only one of the two sides), and the handle 15 is rotatable about the protrusions 151. A periphery of each said protrusion 151 has two flat surfaces 152 opposite to each other (as shown in FIGS. 8 and 9). When the handle 15 is expended or closed, the two flat surfaces 152 abut against an inner wall of the receiving space 13 respectively to restrain the handle 15 from swinging.

The back cover 20 is pivoted to the second end 14, and the back cover 20 is closable or expendable relative to the main body 10 to make an inner surface of the back cover 20 selectively cover or uncover one said side face of the main body 10. Furthermore, the tool holder 1 includes a first direction which passes through the first end 11 and the second end 14 and is defined, the second end 14 is formed with a first foot portion 16 which is transverse to the first direction, and the main body 10 can stand straightly on a plane when the back cover 20 is closed. An outer surface of the back cover 20 is formed with a second foot portion 21, and the second foot portion 21 can make the back cover 20 rest flatly on a plane (the second foot portion may be optionally provided and the back cover can rest flatly on a plane directly) when the back cover 20 is expended. In this embodiment, the main body 10 is for at least one socket 22 (may also be other tools) being arranged between the first end 11 and the second end 14, and the back cover 20 is formed with a plurality of protruding ribs 23 toward the at least one socket 22. Preferably, each said protruding rib 23 may be in different lengths according to a dimension of each said socket 22 so that the socket 22 will not shake or fall out of the main body 10.

In addition, a supporting portion 30 is movably disposed between the main body 10 and the back cover 20. When the back cover 20 is closed, the supporting portion 30 is received between the main body 10 and the back cover 20; and when the back cover 20 is expended, two ends of the supporting portion 30 are positionably disposed on the main body 10 and the back cover 20 respectively and the main body 10 and the back cover 20 are positioned relative to each other.

Figure 5:
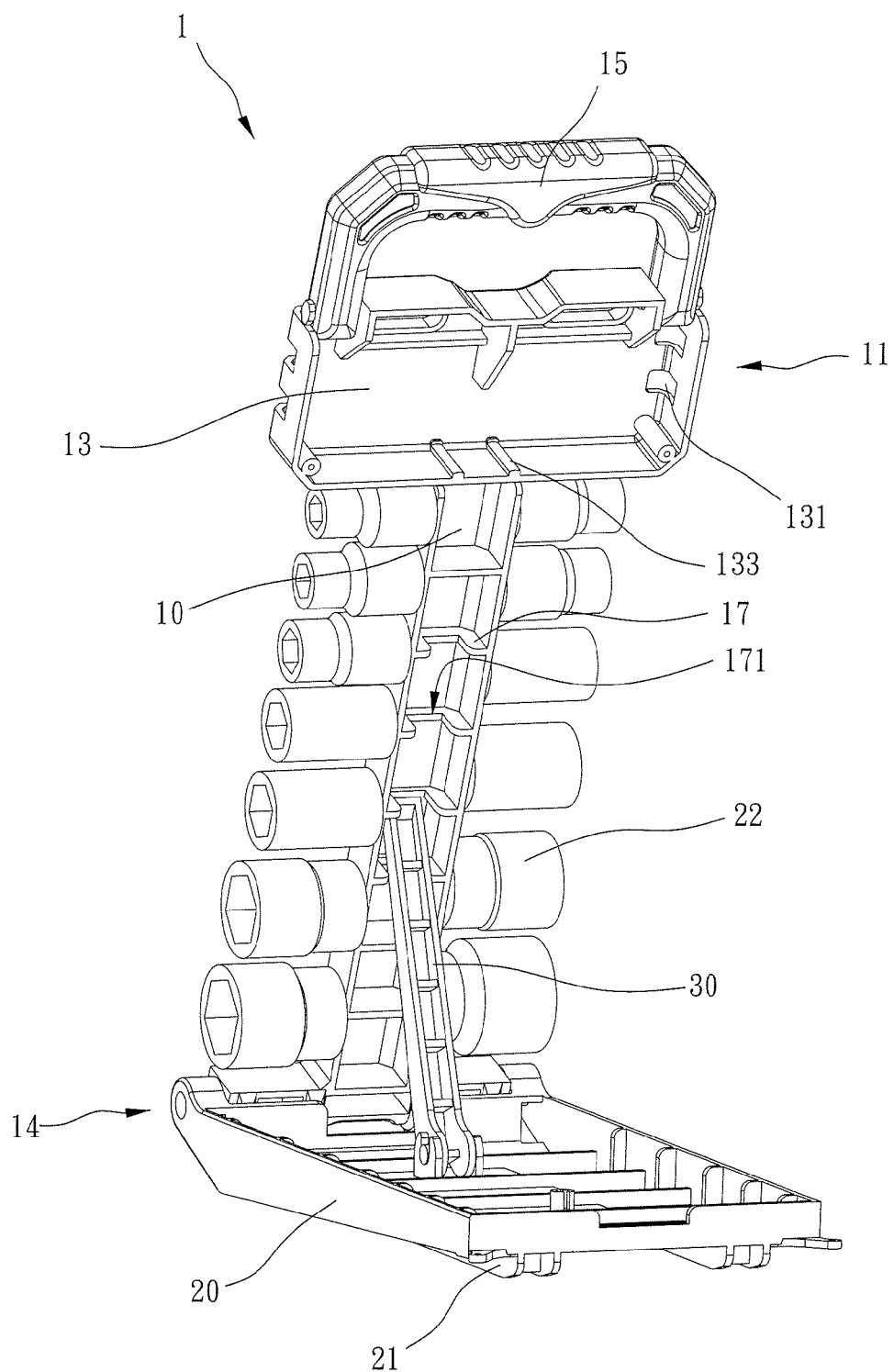
FIG. 5 is a drawing showing the preferred embodiment of the present invention in use.
Figure 6:
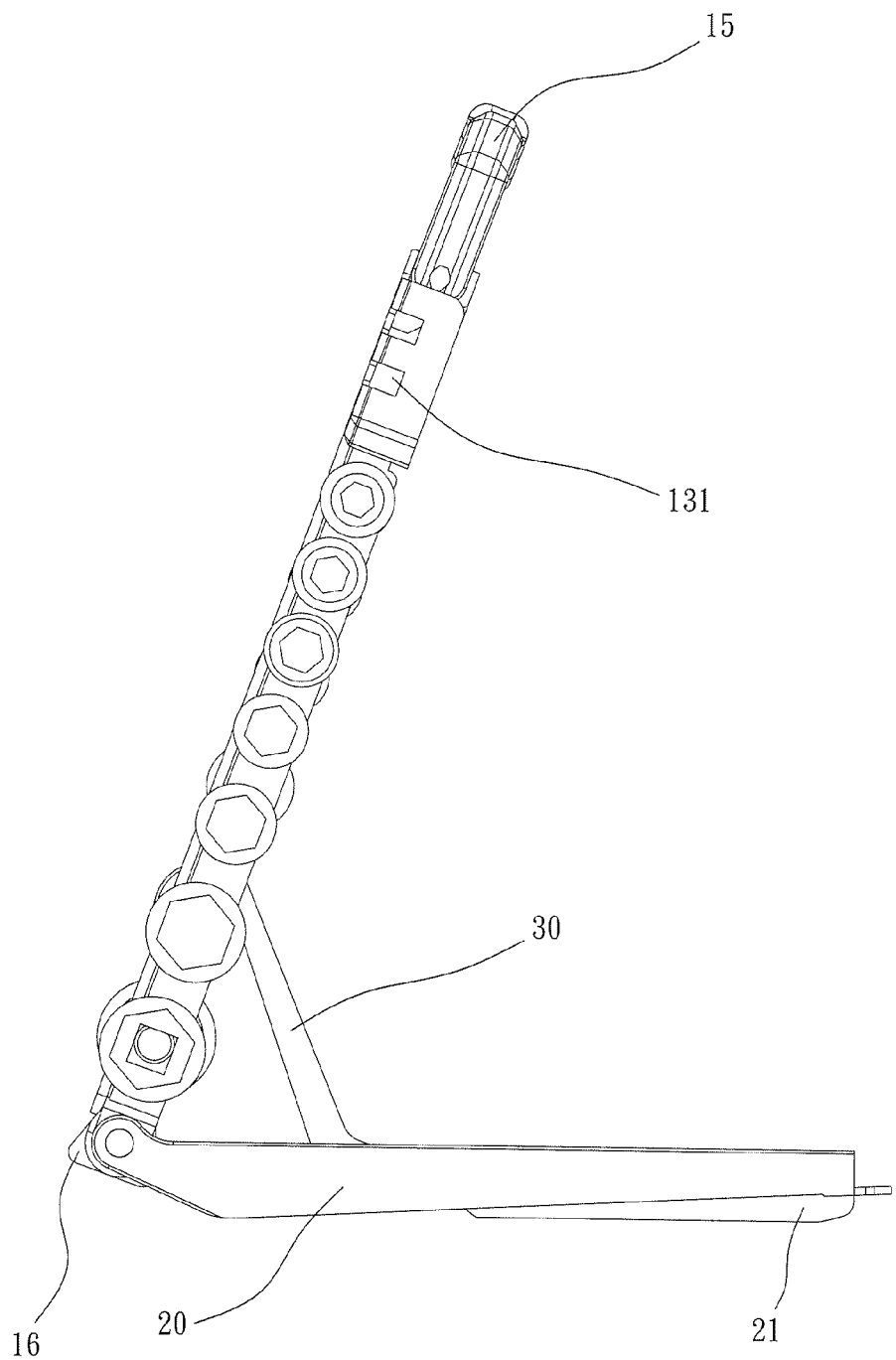
FIGS. 6 and 7 are drawings showing the preferred embodiment of the present invention in use from another perspective.
Figure 7:
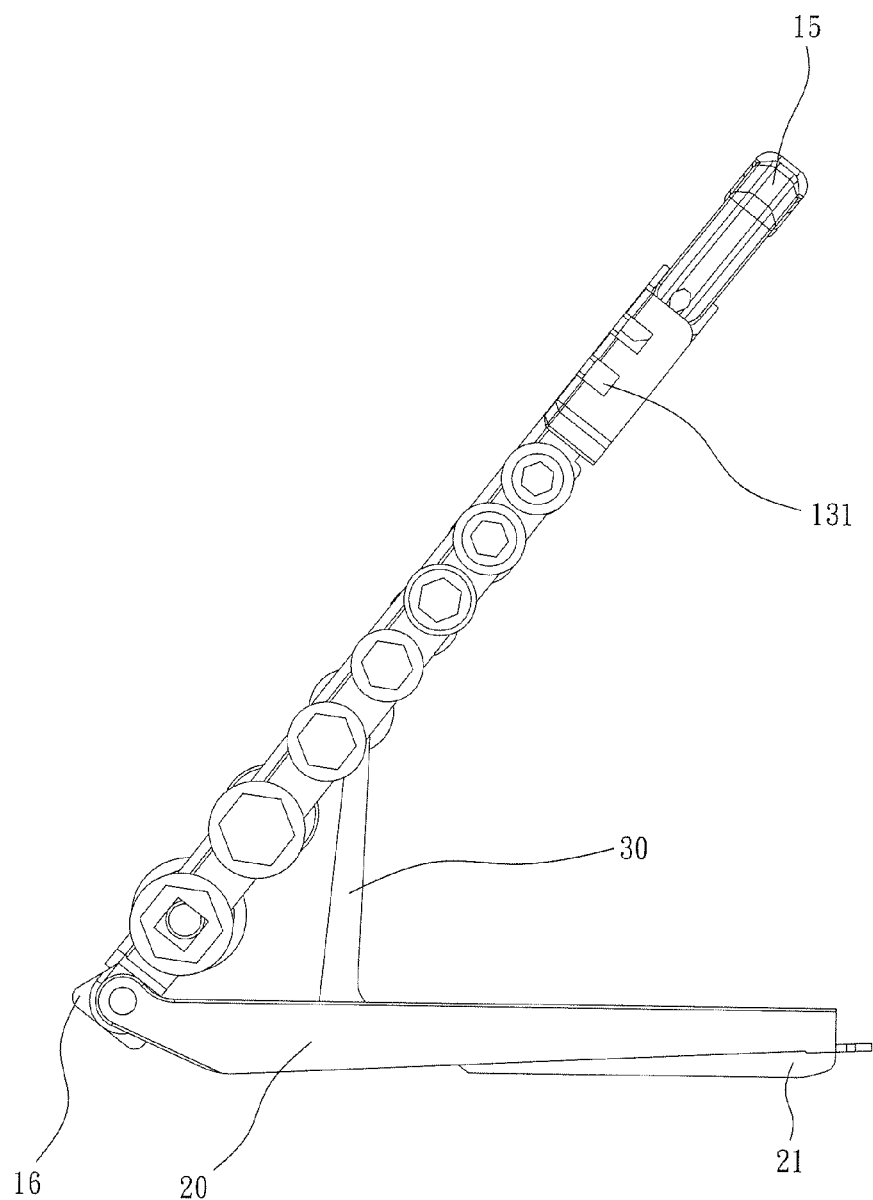

One of the main body 10 and the back cover 20 is pivoted to the supporting portion 30, and the other is formed with a plurality of blocking plates 17 for the supporting portion 30 to abut thereagainst (as shown in FIG. 5). In this embodiment, the blocking plates 17 are disposed on the main body 10, and the back cover 20 is pivoted to the supporting portion 30. Preferably, the supporting portion 30 can abut against different said blocking plates 17 in accordance with a tilt angle of the main body 10 relative to the back cover 20 (as shown in FIGS. 6 and 7). In addition, the plurality of blocking plates 17 are recessively formed with a receiving slot 171. When the back cover 20 is closed, the supporting portion 30 is received in the receiving slot 171 (the back cover may also be recessively formed with a receiving slot to allow the supporting portion to be received in the back cover).

Given the above, the tool holder of the present invention has a closable handle so that it is convenient for the user to carry and put away the tool holder.

In addition, the back cover of the tool holder can be expended to rest on a plane, and the main body and the back cover can be positioned relative to each other through the supporting portion so as to make the main body stand straightly on the plane and make the presentation of the tool holder more diversified.

While we have shown and described various embodiments in accordance with the present invention, it should be clear to those skilled in the art that further embodiments may be made without departing from the scope of the present invention.

What is claimed is:

1. A tool holder, including:
    a main body, having two side faces opposite to each other, an end of the main body being a first end, the other end of the main body being a second end, the first end being formed with a hanging portion;
    a back cover, pivotally connected to the second end, being closable or expandable relative to the main body to make an inner surface thereof selectively cover or uncover one said side face of the main body;
    a handle, disposed on the hanging portion, one said side face of the main body being recessively formed with a receiving space, the handle being selectively expandable or closable to be arranged in the receiving space;
    wherein the main body has at least one through hole communicated with the receiving space, and the main body is formed with, through the at least one through hole, an identification portion from which a part of the handle is viewable.

2. The tool holder of claim 1, wherein the main body is further formed with at least one protruding rib which is protrusive into the receiving space, and when the handle is closed, the at least one protruding rib abuts against the handle.

3. The tool holder of claim 1, wherein each of two sides of the handle is formed with at least one protrusion, the handle is rotatable about the at least one protrusion, a periphery of each said protrusion has two flat surfaces opposite to each other, and when the handle is expanded or closed, the two flat surfaces abut against an inner wall of the receiving space respectively.

4. The tool holder of claim 1, wherein a first direction which passes through the first end and the second end is defined, the second end is formed with a first foot portion which is transverse to the first direction, the main body is able to stand straightly on a plane when the back cover is closed.

5. The tool holder of claim 1, wherein the main body is provided for at least one socket being arranged between the first end and the second end, and the back cover is formed with at least one protruding rib toward the at least one socket.

6. A tool holder, including:
    a main body, having two side faces opposite to each other, an end of the main body being a first end, the other end of the main body being a second end, the first end being formed with a hanging portion;
    a back cover, pivotally connected to the second end, being closable or expandable relative to the main body to make an inner surface thereof selectively cover or uncover one said side face of the main body;
    a handle, disposed on the hanging portion, one said side face of the main body being recessively formed with a receiving space, the handle being selectively expandable or closable to be arranged in the receiving space;
    the supporting portion being movably disposed between the main body and the back cover, when the back cover is closed, the supporting portion is received between the main body and the back cover, when the back cover is expanded, two ends of the supporting portion are positionably disposed on the main body and the back cover respectively and the main body and the back cover are positioned relative to each other.

7. The tool holder of claim 6, wherein one of the main body and the back cover is pivoted to the supporting portion, and the other is formed with a plurality of blocking plates for the supporting portion to abut thereagainst.

8. The tool holder of claim 7, wherein the blocking plates are recessively formed with a receiving slot, and when the back cover is closed, the supporting portion is received in the receiving slot.

* * * * *